US007627166B2

(12) United States Patent
Shah (10) Patent No.: US 7,627,166 B2
(45) Date of Patent: Dec. 1, 2009

(54) METHOD AND MECHANISM FOR PROCESSING IMAGE DATA

(75) Inventor: Shesha Shah, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 682 days.

(21) Appl. No.: 11/291,183

(22) Filed: Nov. 30, 2005

(65) Prior Publication Data

US 2007/0076950 A1     Apr. 5, 2007

(30) Foreign Application Priority Data

Sep. 28, 2005   (IN)   .......................... 897/KOL/2005

(51) Int. Cl.
*G06K 9/00* (2006.01)
(52) U.S. Cl. ...................... 382/162; 382/170
(58) Field of Classification Search ................ 382/162, 382/165, 167, 170; 250/587
See application file for complete search history.

(56) References Cited

U.S. PATENT DOCUMENTS

| | | | | |
|---|---|---|---|---|
| 5,633,511 | A * | 5/1997 | Lee et al. ..................... | 250/587 |
| 6,178,439 | B1 | 1/2001 | Feit | |
| 6,308,212 | B1 | 10/2001 | Besaw et al. | |
| 6,751,348 | B2 * | 6/2004 | Buzuloiu et al. ............ | 382/165 |
| 6,904,560 | B1 | 6/2005 | Panda | |
| 6,963,663 | B1 * | 11/2005 | Yoshida ....................... | 382/167 |
| 7,027,645 | B2 * | 4/2006 | Swift .......................... | 382/165 |
| 7,039,255 | B2 | 5/2006 | Lee et al. | |
| 7,046,865 | B2 | 5/2006 | Kasutani | |
| 7,174,049 | B2 * | 2/2007 | Bhattacharjya ............. | 382/274 |
| 7,333,655 | B1 * | 2/2008 | Swift et al. ................. | 382/165 |
| 7,502,835 | B1 | 3/2009 | Cheng | |
| 2005/0086254 | A1 | 4/2005 | Zou et al. | |
| 2007/0098257 | A1 | 5/2007 | Shah | |
| 2007/0098259 | A1 | 5/2007 | Shah | |

OTHER PUBLICATIONS

Will Archer Arentz and Bjørn Olstad, "Classifying offensive sites based on image content",Computer Vision and Image Understanding 94 (2004) pp. 295-310.*

Ruiz-del-Solar et al, "Characterizing Objectionable Image Content (Pornography and Nude Images) of specific Web Segments: Chile as a case study"IEEE, Publication Date: Oct. 31-Nov. 2, 2005.pp. 1-11.*

(Continued)

*Primary Examiner*—Samir A. Ahmed
*Assistant Examiner*—Mekonen Bekele
(74) *Attorney, Agent, or Firm*—Hickman Palermo Truong & Becker LLP; Christian A. Nicholes (57) ABSTRACT

A method and apparatus for processing image data is provided. Color image data is processed to generate gray scale image data, which may comprise a set of data values. Each data value, of the set of data values, may identify a gray scale value.

A frequency distribution that indicates a frequency of occurrence of each gray scale value identified by the set of data values is determined. The uniformity of the frequency distribution is determined. A determination of how close the frequency determination corresponds to a predetermined distribution is made. The color image data is classified as a particular type of image data based on (a) whether the frequency determination corresponds to the predetermined distribution by a first threshold, and (b) whether the uniformity of the frequency distribution exceeds a second threshold.

36 Claims, 7 Drawing Sheets

OTHER PUBLICATIONS

Michael J. Jones James M. Rehg, "Statistical Color Models with Application to Skin Detection" Dec. 1998, pp. 1-28.*

S. Mukherjea et al., "Towards a multimedia World-Wide Web Information retrieval engine", Computer Networks and ISDN Systems, 29, published 1997, p. 1181-1191.

"Oracle8i Visual Information Retrieval User's Guide and Reference Release 8.1.5, A67293-01", URL: http://www.csee.umbc,edu/help/oracle8/inter.815/a67293/vir_cbr.htm, p. 1-19, published Jan. 28, 2002.

Alameida Souza Coelho et al. "Image Retrieval Using Multiple Evidence Ranking", IEEE Transactions on Knowledge and Data Engineering, vol. 16, No. 4, Apr. 2004, pp. 408-417.

Wei-Hao Lin et al., "Web Image Retrieval Re-Ranking with Relevance Model", Proceedings of the IEEE/WIC International Conference on Web Intelligence (WI'03), published 2003, pp. 1-7.

U.S. Appl. No. 11/316,728, filed Dec. 22, 2005, Corresponding Mailing Date Jun. 1, 2009.

* cited by examiner

302 — Color Image
304 — Gray Scale Image

FIG. 3B

306 — Color Image
308 — Gray Scale Image

METHOD AND MECHANISM FOR PROCESSING IMAGE DATA

RELATED APPLICATION AND CLAIM OF PRIORITY

This application is related to and claims the benefit of priority from Indian Patent Application No. 897/KOL/2005 filed in India on Sep. 28, 2005, entitled "Method And Mechanism For Processing Image Data"; the entire content of which is incorporated by this reference for all purposes as if fully disclosed herein.

FIELD OF THE INVENTION

The present invention generally relates to processing image data for purposes of classifying the image represented by the image data.

BACKGROUND

A digital image is the visual representation of image data. Image data, similarly, is data that describes how to render a representation of an image. The standards and formats for expressing image data are too numerous to fully mention, but several examples include a GIF file, a JPG file, a PDF file, a BMP file, a TIF file, a DOC file, a TXT file, and a XLS file.

Digital images may be used in a variety of contexts and for a variety of purposes. For example, a typical website is comprised of digital images that aid a viewer in navigating the website, such as banners, icons, and buttons. The substantive content of a website also may be expressed using a digital image, e.g., the website may display a photograph, a chart, a map or a graph. Digital photography has also become a popular way for people to take digital photographs, which are examples of digital images. Further, numerous software applications are available for creating and manipulating various kinds of digital images.

Figure 1A:
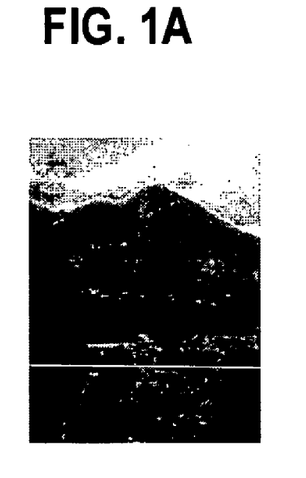
FIG. 1A is a depiction of a photograph of a mountain according to an embodiment of the invention.

Digital images may be classified into several different types. One type of digital image is a digital photograph. A digital photograph (hereinafter a "photograph") is a digital representation of a realistic scene. Non-limiting, illustrative examples of a photograph include a photograph taken by a digital camera, a scanned copy of a physical photograph, or a digital representation of a real-world view. To illustrate, FIG. 1A depicts a photograph of a mountain.

Figure 1B:
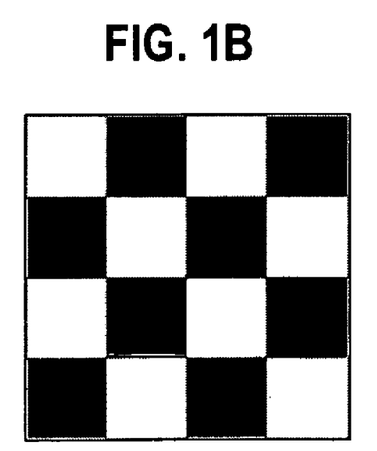
FIG. 1B is a depiction of a graphic of a checkerboard according to an embodiment of the invention.

Another type of digital image is a graphic. Graphics are digital representations that do not qualify as photographs. Graphics do not appear to the human eye as realistic scenes, but rather as generated content. Non-limiting, illustrative examples of graphics are icons, maps, charts, text documents, banners, advertisements, and graphs. To illustrate, FIG. 1B depicts a graphic of a checkerboard.

There are many situations in which it would be advantageous to know whether a particular digital image is a photograph or a graphic. For example, a user may wish to retrieve a map of England from a set of digital images. The user may cause a keyword search on the term "England" to be performed against the set of digital images. Several different types of digital images may satisfy the keyword search. For example, a map of England and a photograph of Big Ben and Parliament may both satisfy the keyword search if both were associated with the term "England." Since a map is a graphic and not a photograph, if all the photographs in the set of digital images being searched were eliminated from consideration, then the search for the map of England may be performed more quickly and the result of the search may produce more pertinent results.

Also, numerous situations exist where a system may treat a photograph differently than a graphic, and thus it would be desirable for the system to know whether a particular digital image is a photograph or a graphic. For example, certain types of digital processing are only applicable only to photographs. Thus, it would be advantageous to determine whether a particular digital image is a photograph or a graphic, because certain types of digital processing may not need to be performed if the digital image is a graphic.

Current techniques for determining whether a digital image is a photograph or a graphic experience several disadvantages. According to one approach (the "visual inspection approach"), a user personally views a digital image to determine whether the digital image is a photograph or a graphic. After making the determination, the user may store data with the digital image that indicates whether it is a photograph or a graphic. While this approach is reliable, it is extremely slow and labor intensive. As a result, the visual inspection approach is impractical for all but a small number of digital images.

According to another approach (the "software approach") for determining whether a digital image is a photograph or a graphic, a software application analyzes a digital image to determine whether the digital image is a photograph or a graphic. Since the software approach can be automated, it is faster and less labor intensive than the visual inspection approach. However, the software approach is not very accurate due to the limitations of the algorithms used by the software application according to the software approach. As a result, the software approach has limited utility.

Therefore, an approach for determining the image type of a particular digital image, which does not experience the disadvantages of the above approaches, is desirable. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Functional Overview

Embodiments of the invention provide for processing image data for purposes of classifying the image represented by the image data. Embodiments may analyze image data to determine whether the image represented by the image data should be classified as a photograph or as a graphic. After determining whether the image represented by the image data should be classified as a photograph or as a graphic, the classification may be used in processing requests for digital images.

In an embodiment, color image data is processed to generate gray scale image data. Color image data is image data that represents a color image, while gray scale image data is image data that represents a gray scale digital image. The gray scale image data comprises a set of data values. These data values may be used when rendering the display of the gray scale image represented by the gray scale image data. Each data value of the set of data values may identify a gray scale value, which may be used when rendering the gray scale digital image represented by the gray scale image data.

To illustrate, a digital image may be represented by a series of rows and columns. A particular row and a particular column may identify a particular position within or portion of the digital image. Each position within the digital image may be associated with a gray scale value. Thus, when rendering a gray scale digital image, the gray scale value associated with a particular position within the gray scale digital image indicates the relative luminance of that particular position of the gray scale digital image.

In an embodiment, analysis is performed on the gray scale image data to determine whether the color image data represents a photograph or a graphic. For example, according to one embodiment, a frequency distribution that indicates a frequency of occurrence of each gray scale value identified by the set of data values is determined. The uniformity of the frequency distribution may be determined. Also, a determination of how close the frequency determination corresponds to a predetermined distribution, such as a laplacian distribution, may be made. Thereafter, if the frequency determination corresponds to a predetermined distribution by at least a first threshold, and the uniformity of the frequency distribution exceeds a second threshold, then the color image data is determined to represent a photograph. On the other hand, if the frequency determination does not correspond to a predetermined distribution by at least a first threshold, or the uniformity of the frequency distribution does not exceed a second threshold, then the color image data is determined to represent a graphic.

Classifying Digital Images

Figure 2:
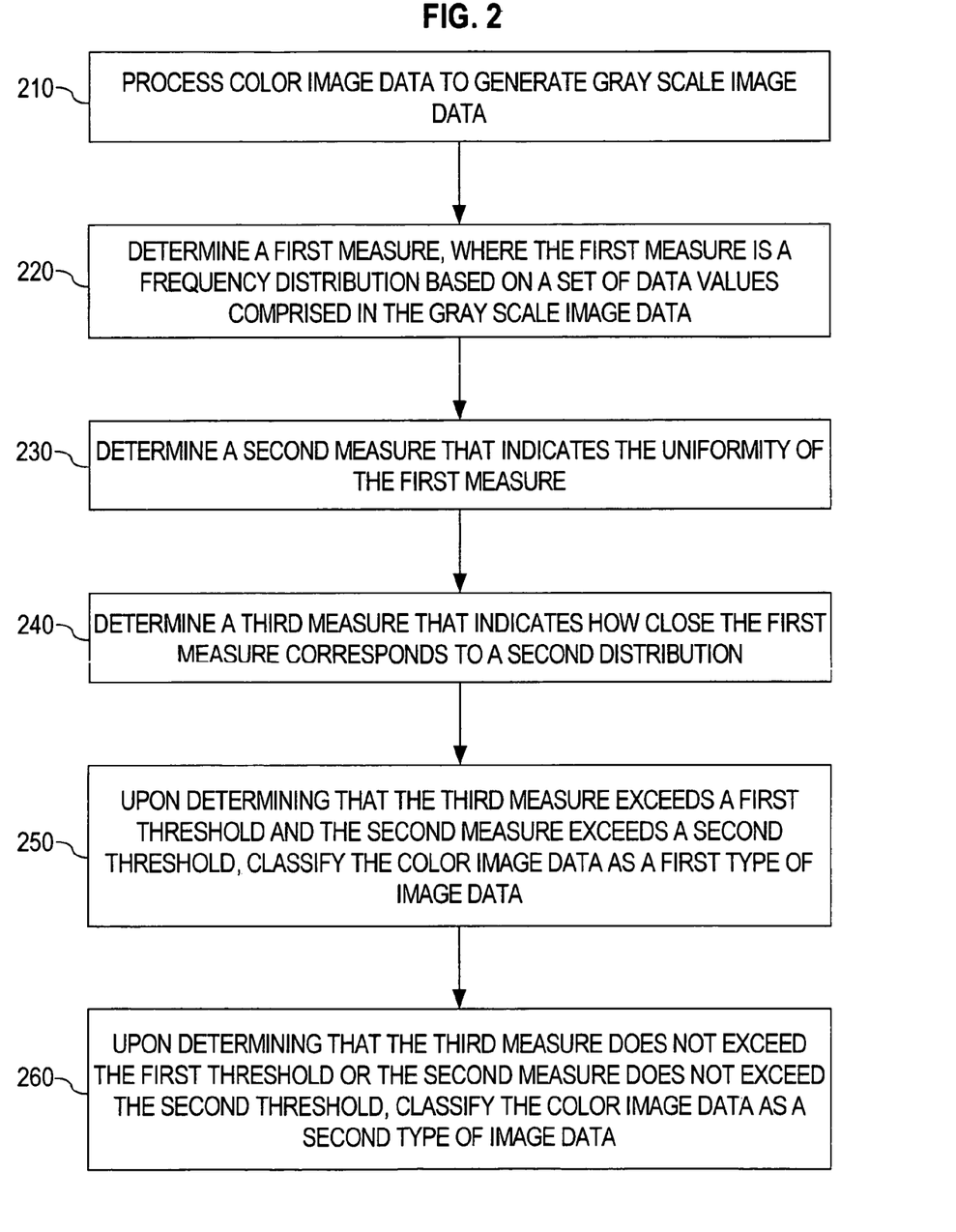
FIG. 2 is a flowchart illustrating the functional steps of classifying image data according to an embodiment of the invention.

FIG. 2 is a flowchart illustrating the functional steps of classifying image data according to an embodiment of the invention. The particular sequence of steps illustrated in FIG. 2 is merely illustrative for purposes of providing a clear explanation. Other embodiments of the invention may perform various steps of FIG. 2 in parallel or in a different order than that depicted in FIG. 2.

Initially, in step 210, color image data is processed to generate gray scale image data. In an embodiment, the color image represented by the color image data may (but need not) be a thumbnail image.

In an embodiment, the gray scale image data may be generated based on the color image data using a software application that converts color image data to gray scale image data. For example, the shareware application ImageMagic or Photoshop by Adobe Systems, Inc. of San Jose, Calif. may be used to convert color image data to gray scale image data.

Figure 3A:
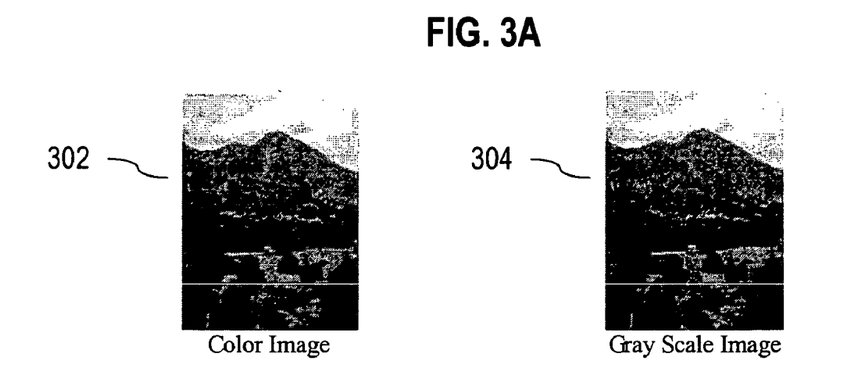
FIG. 3A is a depiction of a gray scale digital image corresponding to the digital image of FIG. 1A according to an embodiment of the invention.

FIG. 3A is a depiction of a digital image 302, represented by color image data, and a digital image 304, represented by gray scale image data, according to an embodiment of the invention. As FIG. 3A shows, digital image 304 depicts the same digital image as digital image 302, except that digital image 304 corresponds to a gray scale digital image, while digital image 302 corresponds to a color digital image. Note that FIG. 3A may not be printed in color, so while digital image 302 corresponds to a color digital image, it may appear as a gray scale digital image in FIG. 3A.

Figure 3B:
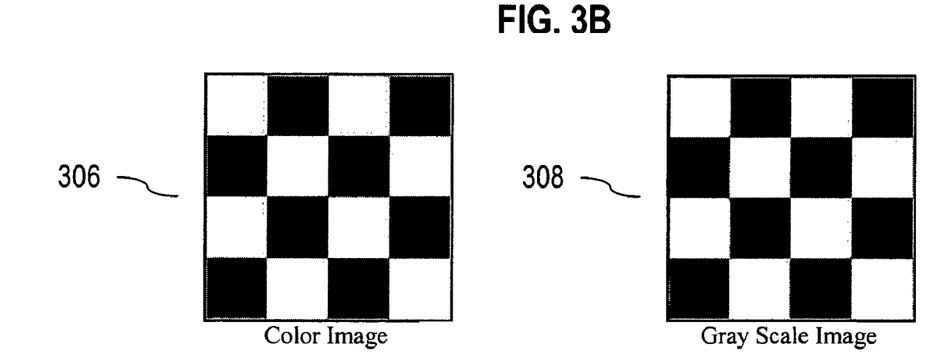
FIG. 3B is a depiction of gray scale digital image corresponding to the digital image of FIG. 1B according to an embodiment of the invention.

Color image data may represent a digital image that is wholly or predominantly in black and white (or shades or gray). To illustrate, FIG. 3B is a depiction of a digital image 306, represented by color image data, and a digital image 308, represented by gray scale image data, according to an embodiment of the invention. As FIG. 3B shows, digital image 308 depicts the same digital image as digital image 306, except that digital image 308 corresponds to a gray scale digital image, while digital image 306 corresponds to a color digital image.

Gray scale image data is composed of a set of data values. The set of data values comprised in the gray scale image data identify how to render the digital image represented by the gray scale image data. For example, every position of a digital image may be identified by a pair of coordinates that indicate the horizontal and vertical location of the position. Each identifiable position of the digital image may also be associated with a gray scale value. A gray scale value is a value, typically ranging from 0 to 255, which indicates a luminance ranging from absolute black (e.g., value 0) to absolute white (e.g., value 255).

The luminance of a color image, which the gray scale values measure, may be determined using a variety of methods known in the art. For example, the color of a given portion of a color image (corresponding to a particular pixel) may correspond to a certain amount of the three primary colors (red, green, and blue). How much of a primary color makes up the color of a given portion of a color image is typically expressed using a range of values from 0 (i.e., no amount of the primary color) to 255 (i.e., the maximum amount of the primary color). Thus, the color to be displayed by a particular pixel may be expressed by a set of three values that expresses how much red, green, and blue make up the color of the color image at that pixel. The luminance of a portion of a color image (such as the portion displayed by a pixel) may be determined using the values of the primary colors that make up the color of that portion using equations known in the art, such as:

luminance=0.299Red+0.587Green+0.114Blue

To render the digital image represented by the gray scale image data, each position on the digital image is displayed using the gray scale value associated with the position. After the gray scale image data is generated, processing proceeds to step 220.

In step 220, a first measure is determined. In an embodiment, the first measure is a frequency distribution that indicates a frequency of occurrence of each gray scale value identified by the set of data values comprised in the gray scale image data. The frequency distribution describes how many times each gray scale value, of the possible gray scale values, occur in the digital image represented by the gray scale image data.

Figure 4A:
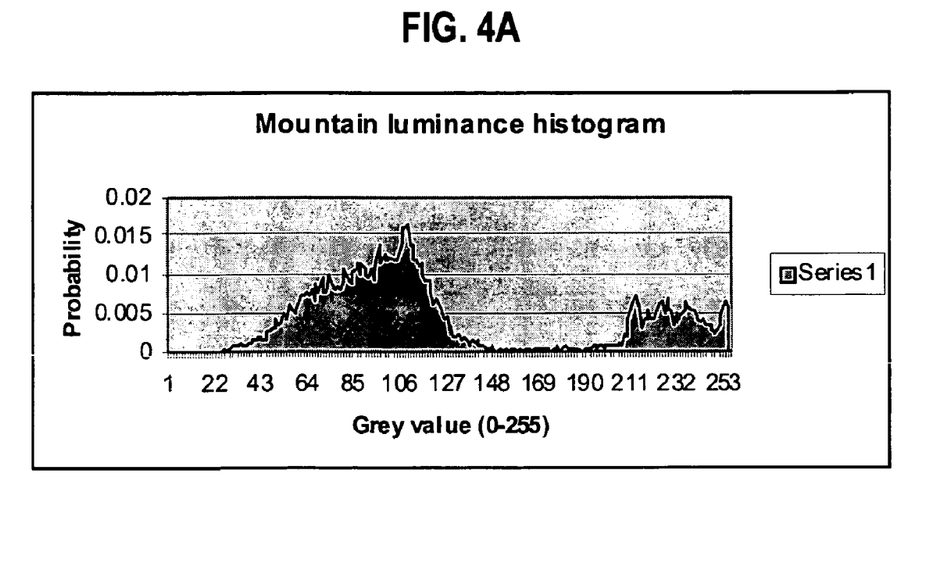
FIG. 4A depicts a normalized luminance histogram for the gray scale digital image of FIG. 3A according to an embodiment of the invention.
Figure 4B:
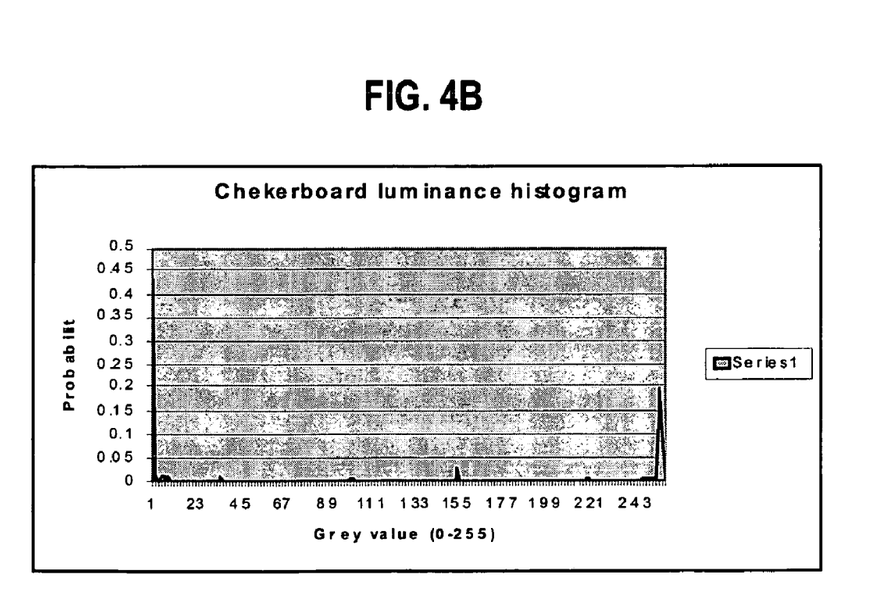
FIG. 4B depicts a normalized luminance histogram for the gray scale digital image of FIG. 3B according to an embodiment of the invention.

In an embodiment, the first measure may be determined by creating a normalized luminance histogram of the gray scale image data generated in step 210. To illustrate, FIG. 4A depicts a normalized luminance histogram for the gray scale digital image of FIG. 3A, and FIG. 4B depicts a normalized luminance histogram for the gray scale digital image of FIG. 3B.

In an embodiment, the first measure of step 220 may be determined using a software application, e.g., the shareware application ImageMagic or Photoshop by Adobe Systems, Inc. of San Jose, Calif. After the first measure is determined, processing proceeds to step 230.

In step 230, a second measure that indicates the uniformity of the first measure is determined. In an embodiment, the second measure may be determined by calculating an entropy value for the first measure. In an embodiment, the entropy value is calculated over the values of the histogram determined in step 220. For example, the entropy value for a normalized luminance histogram may be determined programmatically using a software application. Equations are available and known to those in the art for determining an entropy value for a set of data, e.g., an equation developed by Claude E. Shannon ("Shannon's entropy equation") may be used. In an embodiment, the program may calculate an entropy value using the information about the gray scale values identified in the histogram determined in step 220 using Shannon's entropy equation.

A higher entropy value for a luminance histogram indicates a lower degree of uniformity of the gray scale image data. The lower the degree of uniformity of the gray scale image data, the more likely it is that the image represented by the gray scale image data is a photograph. For example, the checkerboard of FIG. 3B is largely composed of only two colors, namely absolute black and absolute white. As a result, the gray scale image data for the checkerboard of FIG. 3B comprises of a small number of gray scale values, so the entropy value for the histogram of FIG. 4B is relatively low. The low entropy value of the histogram of FIG. 4B suggests that the image represented by the gray scale image data of FIG. 3B is a graphic.

On the other hand, the gray scale image data, for the digital image of the mountain of FIG. 3A, comprises a large number of gray scale values. As a result, gray scale data, for the digital image of the mountain of FIG. 3A, has a relatively high entropy value. The relatively high entropy value of the image of the digital image of the mountain of FIG. 3A suggests that the digital image is a photograph. After the second measure of step 230 is determined, processing proceeds to step 240.

Figure 5:
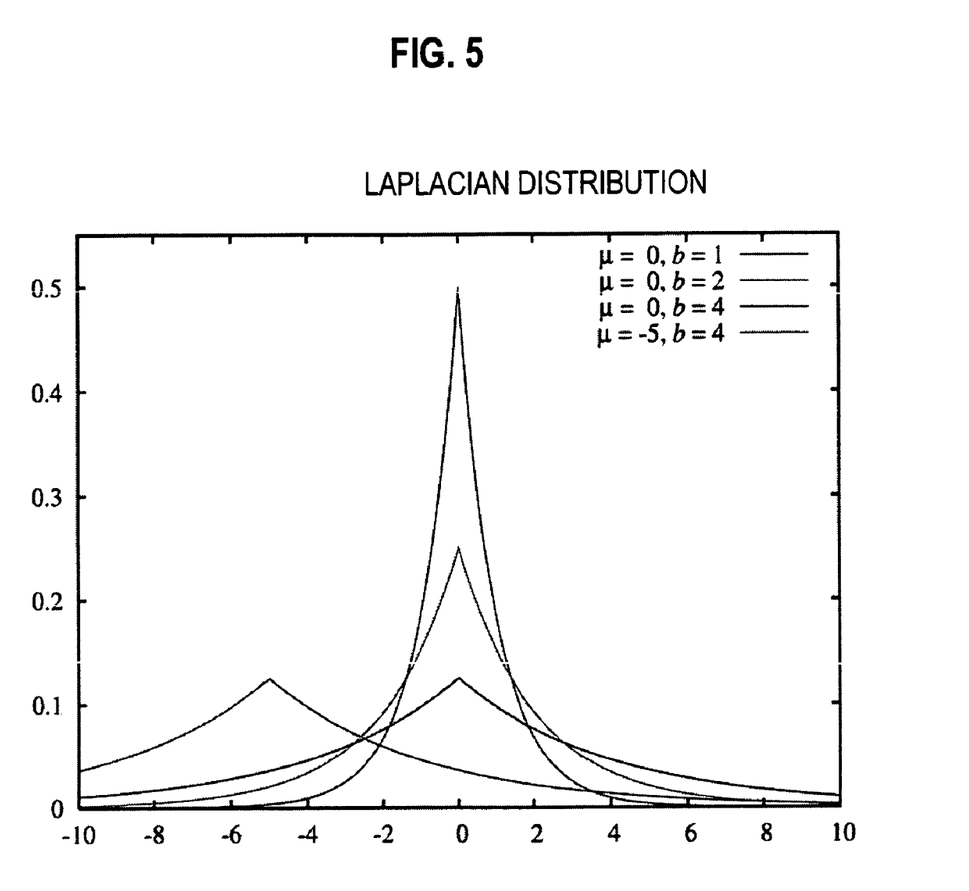
FIG. 5 is an illustrative depiction of a laplacian distribution according to an embodiment of the invention.

In step 240, a third measure that indicates how close the first measure corresponds to a special distribution is determined. In an embodiment, the special distribution of step 240 is a laplacian distribution. An illustrative laplacian distribution is depicted in FIG. 5.

In an embodiment, the third measure may be determined using a chi-squared test. A chi-squared test may be used to determine whether the first measure is sufficiently close to the special distribution. The result of determining a chi-squared test of the first measure to the special distribution is a percentage that indicates how close the first measure is to the special distribution.

While the performance of step 240 has been described with reference, in several embodiments, to a special distribution that is implemented using a laplacian distribution, other embodiments may perform step 240 using a special distribution that is not a laplacian distribution. Accordingly, embodiments of the invention are not limited to the use of a laplacian distribution in the determination of the third measure, as any distribution indicative of a photograph may be employed as the special distribution. After the determination of the third measure, processing proceeds to step 250.

In step 250, upon determining that the third measure exceeds a first threshold, and the second measure exceeds a second threshold, the color image data is classified as image data representing a photograph. When the third measure does exceed the first measure, it is suggestive that the image represented by the color image data is a photograph because the first measure is sufficiently similar to the special distribution. In an embodiment, the first threshold is at least an about 80% correspondence between the first measure and the special distribution. In other embodiments, another first thresholds may be used, as long as the first threshold identifies a level above which it is sufficiently likely that the correspondence between the first measure and the special distribution is strong enough to suggest that the digital image represented by the gray scale image data is a photograph.

In an embodiment, the second threshold is an entropy value of at least 3.7. When the second measure does exceed the second threshold, it is suggestive that the digital image represented by the color image data is a photograph because the entropy value indicates that the degree of uniformity of the gray scale values of the gray scale image data is relatively low. In other embodiments, another second thresholds may be used, as long as the second threshold identifies a level above which it is sufficiently likely that the entropy value of the first measure is high enough to suggest that the digital image represented by the color image data is a photograph.

However, in step 260, upon determining that the third measure does not exceed a first threshold or the second measure does not exceed a second threshold, the color image data is classified as image data representing a graphic. When the third measure does not exceed the first measure, it is suggestive that the digital image represented by the color image data is a graphic because the first measure is not sufficiently similar to the special distribution. When the second measure does not exceed the second threshold, it is suggestive that the digital image represented by the color image data is a graphic because the entropy value indicates that the degree of uniformity of the gray scale values of the color image data is relatively high.

The steps of FIG. 2 may be used to classify color image data as a first type of image data (i.e., color image data that represents a photograph) or a second type of image data (i.e., image data that represents a graphic). The steps of FIG. 2 may be used in a variety of different contexts, as explained in further detail below.

Extensions and Applications

In an embodiment, after classifying color image data as either representing a digital image that is a photograph or a graphic, further determinations may be made regarding the digital image represented by the color image data. For example, if it is determined that a particular digital image is a graphic, then a determination may be made that the digital image does not depict a face or other realistic depictions of human anatomy. Such a determination may be made because a graphic is unlikely to depict a face or other realistic depictions of human anatomy.

Similarly, in another embodiment, if it is determined that a particular digital image is a graphic, then a determination may be made that the digital image does not depict offensive or adult content. Such a determination may be made because a graphic is unlikely to depict offensive or adult content.

In other embodiments of the invention, a user may submit a request to another entity for a set of digital images that match a particular set of characteristics. Embodiments of the invention may be used to retrieve digital images that match the particular set of characteristics with greater speed and accuracy than prior approaches.

Figure 6:
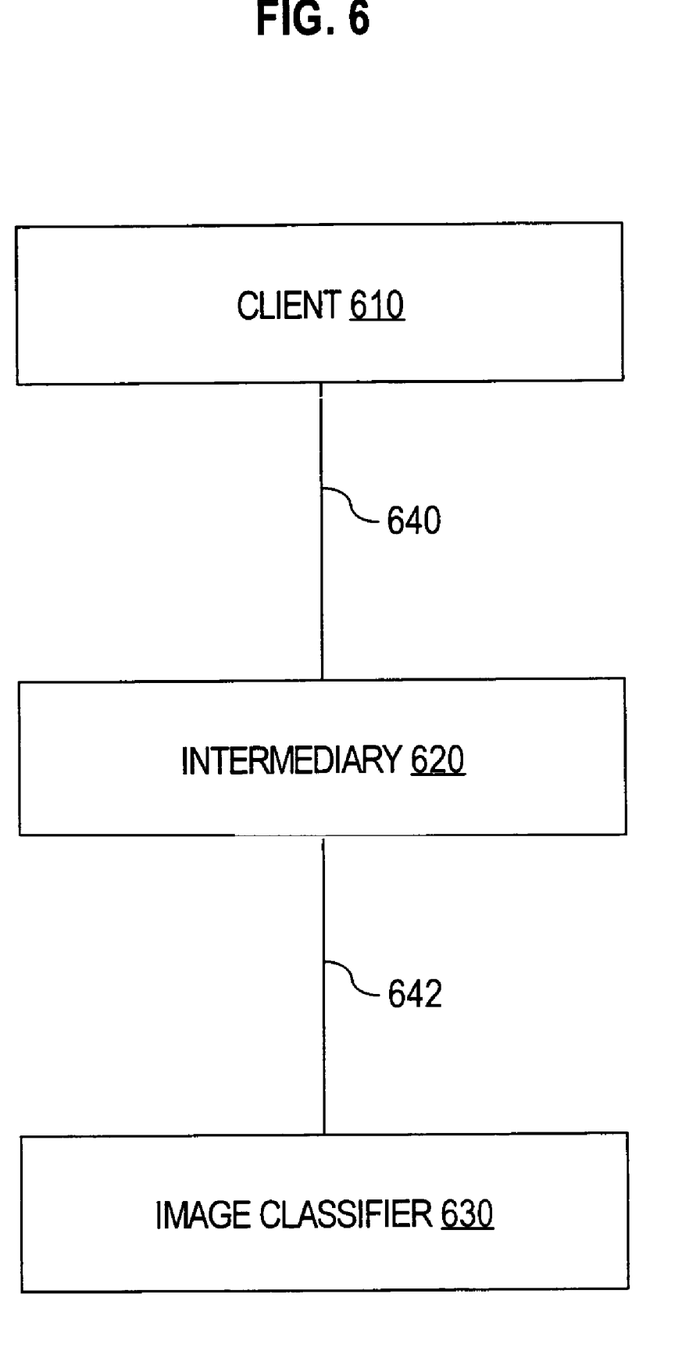
FIG. 6 is an illustration of a system for processing requests for digital images according to an embodiment of the invention.

FIG. 6 is an illustration of a system for processing requests for digital images according to an embodiment of the invention. FIG. 6 depicts a client 610, an intermediary 620, an image classifier 630, and communications links 640 and 642. While client 610, intermediary 620, and image classifier 630 are depicted as separate entities in FIG. 6, other embodiments of the invention may implement one or more of client 610, an intermediary 620, and image classifier 630 on the same physical or logical machine.

Client 610 may be implemented by any medium or mechanism that may be used by a user to transmit, to intermediary 620, a request for a set of digital images that match a particular set of characteristics. For example, client 610 may be implemented as a software application, a web browser, a network device, or a computer system.

Intermediary 620 receives a request for digital images from client 610 and processes the request. After processing the request, intermediary 620 may transfer a set of color image data that represents the digital images that match the particular set of characteristics identified in the request to client 610. In processing the request for digital images, intermediary 620 may access a set of color image data stored at intermediary 620, or at an external location accessible to intermediary 620.

Image classifier 620 may be used by an administrator for a variety of purposes. For example, an administrator may use image classifier 620 to initiate or schedule the performance the steps of FIG. 2. The color image data classified as a result of performing the steps of FIG. 2 may be stored at the intermediary 620, the image classifier 630, or any location accessible to either the intermediary 620 or the image classifier 630. As a result of performing the steps of FIG. 2, classification data may be stored with color image data. Classification data is data that identifies a type of digital image for a digital image represented by color image data. For example, classification data may indicate that a digital image represented by color image data is either a photograph or a graphic.

Communications links 640 may be implemented by any medium or mechanism that provides for the exchange of data between network device 610 and intermediary 620. Communications links 642 may be implemented by any medium or mechanism that provides for the exchange of data between intermediary 620 and image classifier 630. Examples of communications links 640 and 642 include, without limitation, a network such as a Local Area Network (LAN), Wide Area Network (WAN), Ethernet or the Internet, or one or more terrestrial, satellite or wireless links.

In an embodiment, client 610 may be implemented using a web browser. Client 610 may transmit, over the Internet, a request for a set of digital images that match a particular set of characteristics to intermediary 620. Intermediary 620 may be implemented by a server. In processing the request, intermediary 620 may eliminate from consideration a set of color image data that represent digital images that are of a different type of digital image than identified in the particular set of characteristics. For example, if the request is for a set of digital images that are photographs, then the intermediary may eliminate from consideration any color image data that represents a digital image that is a graphic based on the classification data stored with the color image data. After the intermediary identifies the a set of color image data that matches the particular set of characteristics identified in the request, the intermediary transmits the matching set of color image data, corresponding to the one or more matching digital images, to client 610. Advantageously, the request for digital images that match a particular set of characteristics may be processed by the intermediary 620 with greater speed and precision than prior approaches.

Embodiments have been discussed herein with respect to operations performed on image data that represents a digital image. It should be noted that digital images may be cropped, altered, cut, shrunk, enlarged, divided, or otherwise manipulated. Consequently, image data may represent a cropped, alerted, cut, shrunk, enlarged, divided, or manipulated digital image. For example, a single digital image may be divided into two or more digital images, and image data may represent one of the two or more digital images that previously composed an original single digital image. Thus, for ease of explanation, embodiments of the invention have been described with reference to processing image data that represents a digital image. However, other embodiments of the invention may be used to process image data that represents a portion of or a modified version of what a viewer may identify as the original digital image. Thus, embodiments of the invention may be used to perform analysis on image data that represents a portion or modified version of a digital image, e.g., the steps of FIG. 2 may be performed on image data that represents less than the entire digital image.

Embodiments of the invention advantageously provide a fast approach for processing image data to classify the image represented by the image data. By performing the steps illustrated in FIG. 2, embodiments may efficiently and speedily determine whether color image data represents a particular type of image, such as a photograph or a graphic. Further, after digital images have been classified as a particular type of digital image, searches for particular types of digital images may be performed with enhanced speed and efficiency because digital images that do not satisfy the search criteria need not be considered when performing the search.

Implementing Mechanisms

Figure 7:
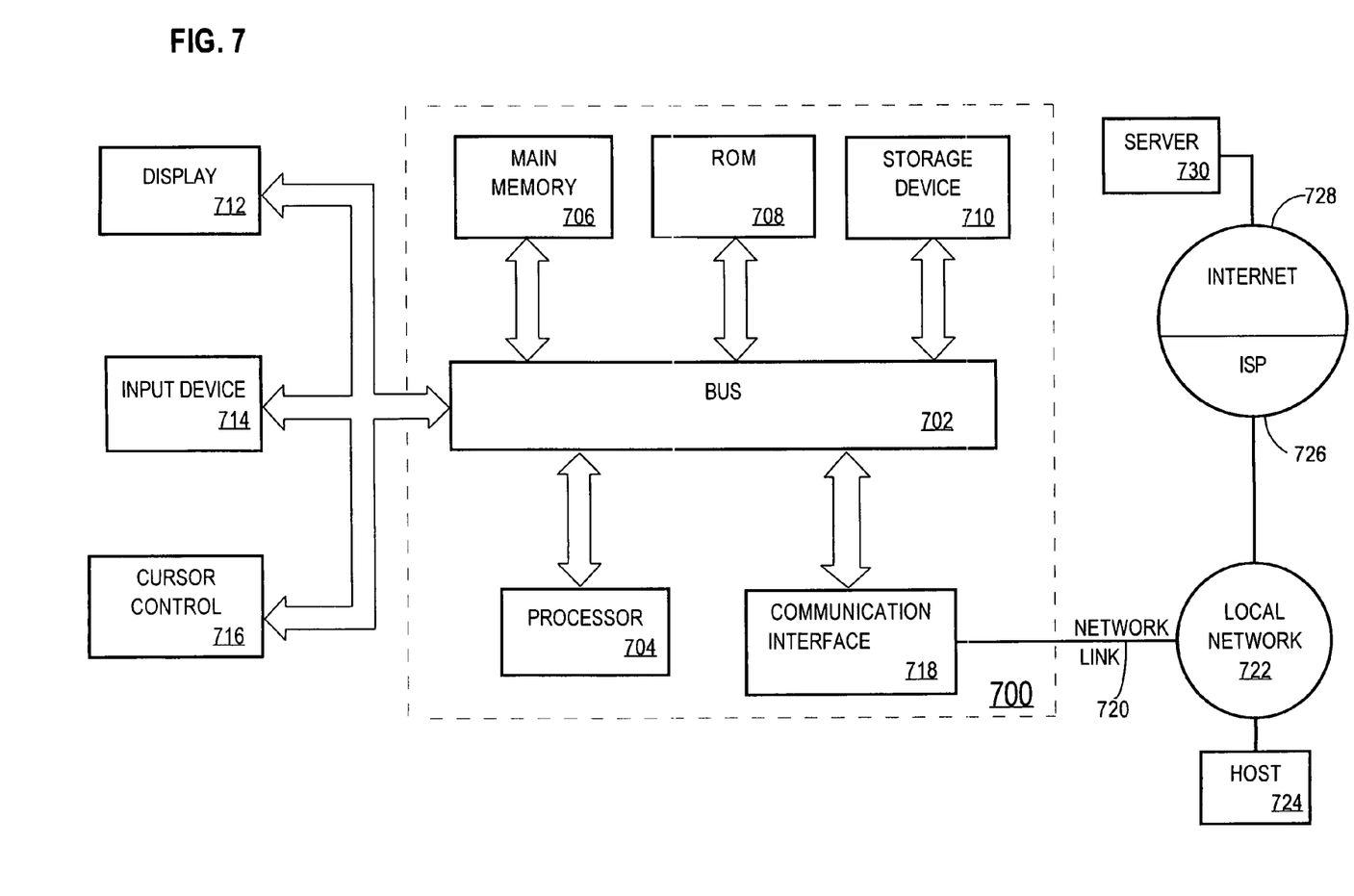
FIG. 7 is a block diagram that illustrates a computer system upon which an embodiment of the invention may be implemented.

In an embodiment, client 610, intermediary 620, and image classifier 630 may be implemented on or using a computer system. FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communication. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for processing image data, comprising:
    processing color image data to generate gray scale image data, wherein the gray scale image data comprises a set of data values, wherein each data value of the set of data values identifies a gray scale value of a sequence of gray scale values;
    determining a first measure, wherein the first measure is a frequency distribution that indicates a frequency of occurrence of each gray scale value, of the sequence of gray scale values, identified by the set of data values;
    determining a second measure that indicates the uniformity of the first measure;
    determining a third measure that indicates how close the first measure corresponds to a second frequency distribution; and
    upon determining that the third measure exceeds a first threshold and the second measure exceeds a second threshold, classifying the color image data as a first type of image data;
    wherein the image data is processed by one or more processors.

2. The method of claim 1, further comprising:
    upon determining that either the third measure does not exceed the first threshold or the second measure does not exceed the second threshold, classifying the color image data as a second type of image data.

3. The method of claim 2, further comprising:
    in response to classifying the color image data as the second type of image data, then determining the color image data does not correspond to an image of a face or of offensive content.

4. The method of claim 1, further comprising:
    generating a normalized first measure that represents a normalized luminance histogram of the gray scale image data.

5. The method of claim 1, wherein the second measure is performed by calculating an entropy value.

6. The method of claim 1, wherein the step of determining the third measure comprises:
    determining a chi-squared test of the first measure against the second frequency distribution.

7. The method of claim 1, wherein the second frequency distribution is a laplacian distribution.

8. The method of claim 1, wherein the first threshold represents at least an about 80% correspondence between the first measure and the second frequency distribution.

9. The method of claim 1, wherein the color image data corresponds to a thumbnail image.

10. The method of claim 1, in response to determining that a particular image is classified as a graphic, then determining the image does not display a face or offensive content.

11. The method of claim 1, further comprising:
    receiving a request for one or more sets of image data, wherein the color image data is in the one or more sets of image data; and
    processing the request based, at least in part, on the classification of the color image data.

12. The method of claim 11, wherein the request is submitted using a web page, and wherein the step of processing the request comprises identifying the one or more sets of image data that matches a set of characteristics identified by said request.

13. A machine-readable medium carrying one or more sequences of instructions for processing image data, wherein execution of the one or more sequences of instructions by one or more processors causes the one or more processors to perform the steps of:
    processing color image data to generate gray scale image data, wherein the gray scale data comprises a set of data values, wherein each data value of the set of data values identifies a gray scale value of a sequence of gray scale values;
    determining a first measure, wherein the first measure is a frequency distribution that indicates a frequency of occurrence of each gray scale value, of the sequence of gray scale values, identified by the set of data values;
    determining a second measure that indicates the uniformity of the first measure;
    determining a third measure that indicates how close the first measure corresponds to a second frequency distribution; and
    upon determining that the third measure exceeds a first threshold and the second measure exceeds a second threshold, classifying the color image data as a first type of image data.

14. The machine-readable medium of claim 13, wherein execution of the one or more sequences of instructions by the one or more processors further causes the one or more processors to perform the step of:
    upon determining that either the third measure does not exceed the first threshold or the second measure does not exceed the second threshold, classifying the color image data as a second type of image data.

15. The machine-readable medium of claim 14, wherein execution of the one or more sequences of instructions by the one or more processors further causes the one or more processors to perform the step of:
    in response to classifying the color image data as the second type of image data, then determining the color image data does not correspond to an image of a face or of offensive content.

16. The machine-readable medium of claim 13, wherein execution of the one or more sequences of instructions by the one or more processors further causes the one or more processors to perform the step of:
    generating a normalized first measure that represents a normalized luminance histogram of the gray scale image data.

17. The machine-readable medium of claim 13, wherein the second measure is performed by calculating an entropy value.

18. The machine-readable medium of claim 13, wherein the step of determining the third measure comprises:
    determining a chi-squared test of the first measure against the second frequency distribution.

19. The machine-readable medium of claim 13, wherein the second frequency distribution is a laplacian distribution.

20. The machine-readable medium of claim 13, wherein the first threshold represents at least an about 80% correspondence between the first measure and the second frequency distribution.

21. The machine-readable medium of claim 13, wherein the color image data corresponds to a thumbnail image.

22. The machine-readable medium of claim 13, in response to determining that a particular image is classified as a graphic, then determining the image does not display a face or offensive content.

23. The machine-readable medium of claim 13, wherein execution of the one or more sequences of instructions by the one or more processors further causes the one or more processors to perform the steps of:
receiving a request for one or more sets of image data, wherein the color image data is in the one or more sets of image data; and
processing the request based, at least in part, on the classification of the color image data.

24. The machine-readable medium of claim 23, wherein the request is submitted using a web page, and wherein the step of processing the request comprises identifying the one or more sets of image data that matches a set of characteristics identified by said request.

25. An apparatus for processing image data, comprising:
one or more processors;
a machine-readable medium carrying one or more sequences of instructions, wherein execution of the one or more sequences of instructions by the one or more processors causes the one or more processors to perform the steps of:
processing color image data to generate gray scale image data, wherein the gray scale image data comprises a set of data values, wherein each data value of the set of data values identifies a gray scale value of a sequence of gray scale values;
determining a first measure, wherein the first measure is a frequency distribution that indicates a frequency of occurrence of each gray scale value, of the sequence of gray scale values, identified by the set of data values;
determining a second measure that indicates the uniformity of the first measure;
determining a third measure that indicates how close the first measure corresponds to a second frequency distribution; and
upon determining that the third measure exceeds a first threshold and the second measure exceeds a second threshold, classifying the color image data as a first type of image data.

26. The apparatus of claim 25, wherein execution of the one or more sequences of instructions by the one or more processors causes the one or more processors to perform the step of:
upon determining that either the third measure does not exceed the first threshold or the second measure does not exceed the second threshold, classifying the color image data as a second type of image data.

27. The apparatus of claim 26, wherein execution of the one or more sequences of instructions by the one or more processors causes the one or more processors to perform the step of:
in response to classifying the color image data as the second type of image data, then determining the color image data does not correspond to an image of a face or of offensive content.

28. The apparatus of claim 25, wherein execution of the one or more sequences of instructions by the one or more processors causes the one or more processors to perform the step of:
generating a normalized first measure that represents a normalized luminance histogram of the gray scale image data.

29. The apparatus of claim 25, wherein the second measure is performed by calculating an entropy value.

30. The apparatus of claim 25, wherein the step of determining the third measure comprises:
determining a chi-squared test of the first measure against the second frequency distribution.

31. The apparatus of claim 25, wherein the second frequency distribution is a laplacian distribution.

32. The apparatus of claim 25, wherein the first threshold represents at least an about 80% correspondence between the first measure and the second frequency distribution.

33. The apparatus of claim 25, wherein the color image data corresponds to a thumbnail image.

34. The apparatus of claim 25, in response to determining that a particular image is classified as a graphic, then determining the image does not display a face or offensive content.

35. The apparatus of claim 25, wherein execution of the one or more sequences of instructions by the one or more processors causes the one or more processors to perform the steps of:
receiving a request for one or more sets of image data, wherein the color image data is in the one or more sets of image data; and
processing the request based, at least in part, on the classification of the color image data.

36. The apparatus of claim 35, wherein the request is submitted using a web page, and wherein the step of processing the request comprises identifying the one or more sets of image data that matches a set of characteristics identified by said request.

* * * * *

UNITED STATES PATENT AND TRADEMARK OFFICE
CERTIFICATE OF CORRECTION

| | | |
|---|---|---|
| PATENT NO. | : 7,627,166 B2 | Page 1 of 1 |
| APPLICATION NO. | : 11/291183 | |
| DATED | : December 1, 2009 | |
| INVENTOR(S) | : Shesha Shah | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 966 days.

Signed and Sealed this

Twenty-first Day of December, 2010

David J. Kappos
*Director of the United States Patent and Trademark Office*